United States Patent [19]

Rupprecht

[11] 4,067,419

[45] Jan. 10, 1978

[54] BRAKE

[75] Inventor: Kurt Rupprecht, Wolfsburg, Germany

[73] Assignee: Volkswagenwerk Aktiengesellschaft, Wolfsburg, Germany

[21] Appl. No.: 690,049

[22] Filed: May 25, 1976

[30] Foreign Application Priority Data

June 4, 1975 Germany .......................... 2524686

[51] Int. Cl.² ............................................ F16D 65/60
[52] U.S. Cl. ........................ 188/79.5 GT; 188/196 V
[58] Field of Search ................ 188/79.5 P, 79.5 GT, 188/196 R, 196 P, 196 V

[56] References Cited

U.S. PATENT DOCUMENTS

| 2,018,567 | 10/1935 | Page | 188/79.5 GT |
| 2,046,420 | 7/1936 | La Brie | 188/79.5 P |
| 2,065,292 | 12/1936 | Schnell | 188/79.5 P UX |
| 2,419,784 | 4/1947 | Low | 188/79.5 P X |

Primary Examiner—Duane A. Reger
Attorney, Agent, or Firm—Spencer & Kaye

[57] ABSTRACT

A self-adjusting brake having a brake drum, primary and secondary brake shoes, a brake cylinder and a stationary brake shoe support for floatingly mounting the brake shoes. The latter are arranged interiorly of the brake drum and coact with it, the ends of the brake shoes being curved and pressed against the brake cylinder and the brake shoe support by means of return springs which also serve to lift the brake shoes off the brake drum when the brake is in non-actuated condition. Each brake shoe carries a brake lining and has a web which has associated with it an inclined surface that coacts with a respective pin, the inclination of the surfaces being such that the amount of play between the brake lining and the brake drum, when the brake is in non-actuated condition, remains substantially constant during displacement of the brake shoe as a result of wear of the brake lining. The return springs are so configured and arranged that the line of action of the resultant spring force acting on the primary brake shoe passes through the instantaneous axis of the primary brake shoe and the resultant spring force acting on the secondary brake shoe passes through the instantaneous axis of the secondary brake shoe. The inclined surfaces are arranged in that half of each respective brake shoe which abuts the brake cylinder, with each inclined surface being tangential to the instantaneous axis of the respective brake shoe.

5 Claims, 1 Drawing Figure

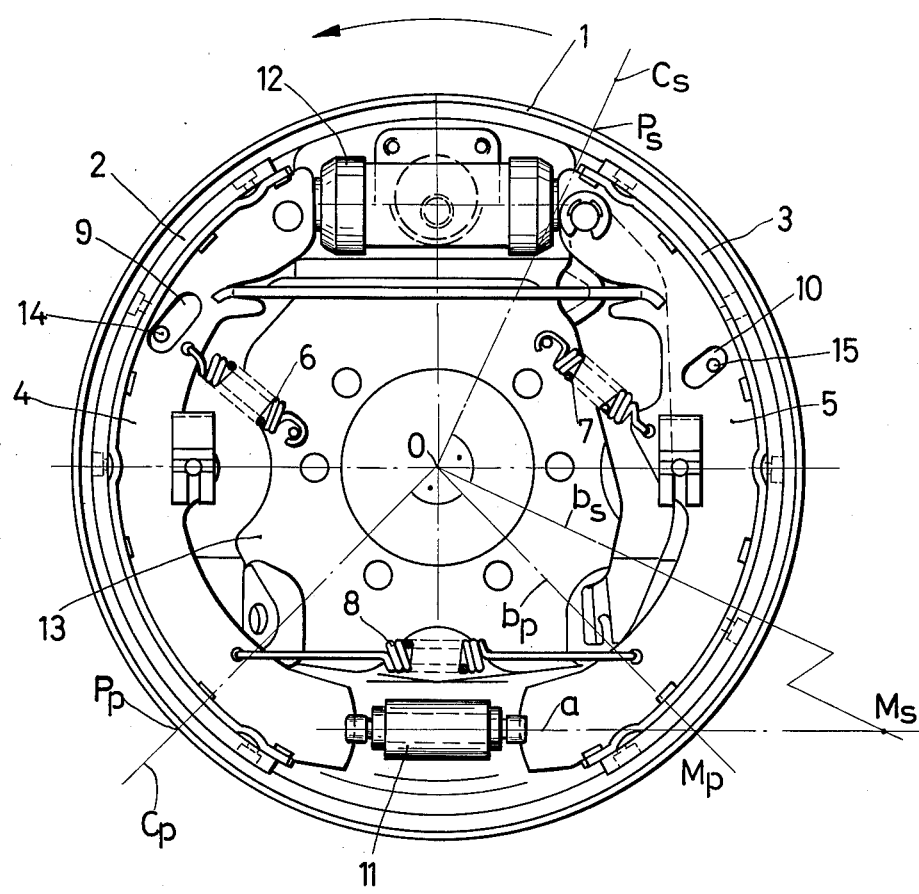

BRAKE

BACKGROUND OF THE INVENTION

The present invention relates to a self-adjusting brake, particularly a drum-type brake equipped with internal brake shoes which are self-adjusting to compensate for wear of the brake lining.

More particularly, the present invention relates to a self-adjusting brake having a brake drum, two brake shoes, a brake cylinder and a stationary brake shoe support for floatingly mounting the brake shoes. The latter are arranged interiorly of the brake drum and coact with it, the ends of the brake shoes being curved and pressed against the brake cylinder and the brake shoe support by means of return springs which also serve to lift the brake shoes off the brake drum when the brake is in non-actuated condition. One of the two brake shoes is the primary brake shoe and the other is the secondary brake shoe, these designations being taken with respect to the direction of rotation of a wheel with which the brake is associated. The primary brake shoe is the one the leading edge of which, during normal rotation of the drum, contacts the brake cylinder, whereas the secondary brake shoe contacts the brake cylinder with its trailing edge. Each brake shoe has a T-shaped cross section constituted by a flange forming the top of the T and a web which forms the stem of the T, the flange of each brake shoe carrying a brake lining, with each web having associated with it means which form an inclined surface coacting with a respective stationary pin, the inclination of the inclined surfaces being such that the amount of the play between the brake lining carried by the brake shoes and the brake drum, when the brake is in non-actuated condition, remains substantially constant during displacement of the brake shoes resulting from wear of the brake lining.

Various efforts have been made to develop self-adjusting brakes of the above type while reducing the very high costs incident to such brakes, such as interlocks, detents, wedges and friction members. In one such self-adjusting brake, as shown, for example, in German Patent Application No. 1,077,077 published March 3rd, 1960, the inclined surfaces are arranged approximately in the middle of the brake shoe, at the outer edge of the web, and are constituted by the material of which the web itself is made. The precise inclination of these surfaces required for trouble-free operation must of necessity be determined experimentally. This, however, is not wholly satisfactory because frequently a long series of tests must be carried out until a practical result is obtained. The brake arrangement has a total of four return springs, there being two for each brake shoe. Both of the return springs associated with each brake shoe are inclined with respect to the longitudinal axis of the associated brake cylinder, one of them being connected at its two ends to the ends of the two brake shoes which abut the brake cylinder in question whereas the other of the two springs has one connected to the brake cylinder and the other end to the respective brake shoe. The configuration and effective lines of action of the springs must be such that when the brake is in its non-actuated condition, all of the forces exerted by the springs are brought into a stable equilibrium so as to avoid any forces or moments which would tend to move the brake shoes out of the concentric position. It is not readily apparent how this is or can be done, or what the direction of the effective forces is.

It is, therefore, the primary object of the present invention to provide a self-adjusting brake which overcomes the above drawbacks, namely, a brake which incorporates a self-adjusting device and which can be built in such a way as to obtain the desired result.

SUMMARY OF THE INVENTION

With the above objects in view, the present invention resides in a self-adjusting brake of the above type, in which return spring means are provided which are so configured and arranged that the line of action of the resultant spring force acting on the primary brake shoe passes through the instantaneous axis of the primary brake and the line of action of the resultant spring force acting on the secondary brake shoe passes through the instantaneous axis of the secondary brake shoe, the location of these axes being defined more particularly below. Moreover, the inclined surfaces are arranged in that half of each respective brake shoe which abuts the brake cylinder, with each inclined surface being tangential to the instantaneous axis of the respective brake shoe.

In accordance with a preferred embodiment of the present invention, the return spring force is provided by three springs, one of which is parallel to the longitudinal axis of the brake shoe support and has its ends connected, respectively, to the two ends of the two brake shoes which abut the brake shoe support. The second spring has one end connected to the primary brake shoe and its other end to a stationary point of the brake, while the third spring has one end connected to the secondary brake shoe and its other end to a stationary point of the brake. The second and third springs each form a relatively large angle with the longitudinal axis of the brake shoe support.

BRIEF DESCRIPTION OF THE DRAWING

The single FIGURE is a schematic illustration showing the components of a self-adjusting brake in accordance with the present invention.

DETAILED DESCRIPTION OF THE PREFERRED EMBODIMENT

Referring now to the drawing, the same shows a brake according to the present invention, which includes a brake drum 1 associated with a wheel (not shown), within which drum are arranged two brake shoes 2 and 3, the same being suspended on a so-called floating mount in that the curved lower ends of the brake shoes bear against a stationary brake shoe support 11 while the curved upper ends of the brake shoes bear against a brake cylinder 12 which is located in the region of the upper end of the brake arrangement. Thus, when fluid under pressure is supplied to the brake cylinder, the brake shoes will be urged into frictional engagement with the inner cylindrical surface of the brake drum 1.

Assuming the normal direction of rotation of the wheel carrying the drum to be that which is indicated by the arrow, the brake shoe 2 constitutes the primary braking element whereas the brake shoe 3 constitutes the secondary braking element. That is to say, with the wheel with which the brake drum 1 is associated, rotating as shown by the arrow, the primary brake shoe, as explained above, is the one the leading edge of which contacts the brake cylinder 12.

As is conventional in the art, each brake shoe has a T-shaped cross section, the shoes 2 and 3 having so-called cross pieces or webs 4, 5, respectively, as well as curved flanges carrying the usual wear-resistant brake lining which comes into actual contact with the inner cylindrical surface of the brake drum 1.

When the brake pressure is released, the brake shoes 2 and 3 are returned to the non-actuated or rest position by means of return springs 6, 7 and 8. The distance which, with the brake in non-actuated condition, the brake shoes are spaced from the inner surface of the brake drum is the amount of play which, during initial assembly of the brake, can be adjusted, for example, by means of a set screw (not shown) forming part of the stationary brake shoe support 11.

Due to progressive wear of the brake linings, the brake shoes 2 and 3 will gradually turn down, this movement taking place about their respective instantaneous axes $M_p$ and $M_s$. The locations of these axes can readily be determined by those skilled in the art (e.g. German Journal "Automobiltechnische Zeitschrift" 1954, pages 197–202). The axes $M_p$, $M_s$ are formed in the illustrated embodiment, by the intersection of the extended longitudinal axis $a$ of the stationary brake shoe support 11 with respective lines $b_p$, $b_s$, each of which passes through the geometric center 0 of the brake arrangement and is itself at right angles to a respective line $c_p$, $c_s$, that passes through point 0 and the theoretical maximum pressure point $P_p$, $P_s$, of the respective brake shoe. But for such an arrangement, the amount of play, or the size of the gap between the brake shoe and the inner surface of the brake drum when the brake shoes are in the non-actuated position, would continuously increase as the brake linings become increasingly worn; this, in turn, would mean that as the linings become more and more worn, the amount of travel through which the brake shoes would have to move in order to bring about a braking action would increase. To prevent this increased travel, the webs 4, 5, of the brake shoes are provided with inclined surfaces 9 and 10, respectively, which, in the illustrated embodiment, are in the form of elongated openings formed in the webs themselves. These openings have protruding into them stationary abutment pins or the like 14 and 15 which are mounted on the brake casing or cover plate 13, the arrangement of the parts being such that when the brake pressure is released, the inclined surfaces 9, 10, will come to abut against the pins 14, 15, respectively, under the influence of the return springs. The gap that is formed between the surfaces 9, 10 and the abutment pins 14, 15, when a brake force has been applied represents the play of the brake, which, as mentioned above, is selected during the assembly of the brake components.

According to the present invention, the inclined surfaces 9, 10 are arranged in the half of each brake shoe which coacts with the brake cylinder 12, with the inclined surface 9 of the primary brake shoe 2 being oriented tangentially with respect to the respective instantaneous axis $M_p$ and the inclined surface 10 of the secondary brake shoe 3 being oriented tangentially with respect to the respective instantaneous axis $M_s$. Moreover, the return springs 6, 7 and 8 are so configured and arranged that the resultant line of action of the return spring force acting on the primary brake shoe 2 passes through the associated instantaneous axis $M_p$ and the resultant line of action of the return spring force acting on the secondary brake shoe 3 passes through the associated instantaneous axis $M_s$. As a result of this, the size of the gap selected during the assembly of the brake components will remain substantially the same, with a high degree of accuracy, despite progressive wear of the brake linings. The closer the inclined surfaces 9, 10, are to the brake cylinder 12, the more closely will the originally selected gap size be maintained. Moreover, the spring force that has to be exerted by the return springs is reduced. In theory, the optimum result would be attained if the inclined surfaces were circular arcs having at their center the instantaneous axis of the respective brake shoe, but in practice, a high degree of constancy is maintained simply by letting the inclined surface extend substantially tangentially with respect to these axes.

Thanks to the above-described configuration and arrangement of the return springs, the brake shoes will, when the brake is in its non-actuated condition, always lie firmly against their two abutments, namely, the stationary brake shoe support 11 and the abutment pins 14, 15, respectively. This is so because none of the return springs produce components which would tend to move the brake shoes up or down. If this were not so, it would, for all practical purposes, not be possible to maintain the amount of play constant because then the brake shoes could drift up or down, depending on the direction of the spring force component. In the first case, the selected amount of play would be increased, and in the second case, it would be decreased.

In the illustrated embodiment, the return spring means includes the three springs 6, 7 and 8 referred to above. The first spring 8 extends parallel to the longitudinal axis of the stationary brake shoe support 11 and has its ends connected to those ends of the two brake shoes 2 and 3 at which these brake shoes abut the stationary brake shoe support 11. The second spring 6 has one end connected to the primary brake shoe 2 and its other end connected to a stationary point on the brake housing or cover 13. Similarly, the third spring 7, has one end connected to the secondary brake shoe 3 and its other end anchored to a stationary point of the brake housing or cover 13. The amount of travel of the return springs, whose spring tension remains practically constant, depends on the amount of play of the brake.

The above-described brake adjustment device will readily function even during heat build-up in the brake, which is something that not every self-adjusting brake device can do. As is known in the art, when the brake heats up, the diameter of the brake drum increases, and many conventional brake adjusting devices, after carrying out their intended function of compensating for the changed dimension resulting from the increased temperature, will, after the brake has cooled down, and with the brake in its non-actuated position, cause the brake shoes to come into contact with the brake drum, and sometimes even cause the brake shoes to lock the wheel. The self-adjusting compensating device according to the present invention, however, will maintain the predetermined amount of play even when the brake heats up. This is so because when the brake drum cools down, resulting in decreased diameter, the brake drum touches the brake lining at the lowermost end of the brake shoe, i.e., at the end of the brake shoe which is nearest to the stationary brake shoe support 11, thereby pushing the brake shoe back into the position which it occupied prior to the temperature rise. This restores the original amount of play.

Fashioning the inclined slots 9, 10 as elongated openings or slits brings additional advantages. For one thing, the dimensions and spatial orientation of the pins and the elongated openings can be so matched to each other that no adjusting elements are needed in order to provide the initially desired amount of play. In conventional brakes, the elements which coact with the inclined surfaces are in the form of adjustable eccentric elements, or the brake cylinder or the stationary support will be provided with screws or other means for adjusting the axial length thereof. The use of such adjusting elements can, in accordance with the present invention, be dispensed with, making the diameter of the abutment pins 14, 15 smaller than the width of the respective elongated opening 9, 10, by an amount that is equal to the amount of the desired play of each brake shoe. The pins are so positioned on the brake casing or cover that those sides of the elongated openings which are directed away from the brake linings will engage the pins 14, 15, the first time the brake is vigorously actuated. In addition, the bending resistance of the pins 14, 15, is selected to be such that when the brake is vigorously actuated for the first time, the pins will, if necassary, become permanently deformed until the brake lining lies against the brake drum 1. It will be appreciated that, in this way, the initial steps that need be taken for selecting the basic amount of play are significantly simplified, because now all that is necessary is that the pins be welded, riveted or otherwise be secured in place. This advantageous arrangement can be improved still further by increasing the width of the elongated openings 9, 10, in the direction in which the brake shoes are displaced as the result of wear of the brake lining. In this way, those sides of the elongated openings 9, 10, which are remote from the brake linings will engage the pins 14, 15, only when the brake lining is new, so as to make it possible to adjust the amount of play of the brake by vigorously actuating the brake.

It will be understood that the above description of the present invention is susceptible to various modifications, changes and adaptations, and the same are intended to be comprehended within the meaning and range of equivalents of the appended claims.

What is claimed is:

1. In a self-adjusting brake having a brake drum, two brake shoes having curved ends, said brake shoes being mounted interiorly of the brake drum and coacting therewith, brake cylinder means and stationary brake shoe support means for floatingly mounting said brake shoes, and return spring means for pressing one curved end of each respective brake shoe against said brake cylinder means and the other curved end of each respective brake shoe against said brake shoe support means and for lifting said brake shoes off the brake drum when the brake is in non-actuated condition, one of said brake shoes being, with respect to the normal direction of rotation of the brake drum, the primary brake shoe and the other being the secondary brake shoe, the primary brake shoe being the one the leading edge of which, during such normal rotation of the brake drum, contacts the brake cylinder, each of the brake shoes having a T-shaped cross section constituted by a flange forming the top of the T and a web forming the stem of the T, the flange of each brake shoe carrying a brake lining, there being associated with the web of each brake shoe means forming an inclined surface coacting with respective stationary pin means, the inclination of said surfaces being such that the amount of the play between the brake lining carried, said brake shoes and the brake drum, when the brake is in non-actuated condition, remains substantially constant during displacement of the brake shoes resulting from wear of the brake lining, the improvement that a. said return spring means are configured and arranged such that the line of action of the resultant spring force acting on said primary brake shoe passes through the instantaneous axis $M_p$ of said primary brake shoe and the line of action of the resultant spring force acting on said second brake shoe passes through the instantaneous axis $M_s$ of said secondary brake shoe; and b. said means forming said inclined surfaces are arranged in that half of each respective brake shoe which abuts said brake cylinder means, with each inclined surface being tangential to the instantaneous axis of the respective brake shoe.

2. The combination defined in claim 2, wherein said means which form the inclined surface associated with each brake shoe are constituted by elongated openings which are provided in the web of each respective brake shoe.

3. The combination defined in claim 2, wherein said pin means extend into said elongated openings, each pin means having a diameter which is smaller than the width of the respective elongated opening by an amount that is equal to the amount of the desired play of the respective brake shoe, said pin means being so positioned that that side of the respective elongated opening which is directed away from the brake lining carried by the respective brake shoe will engage the pin means the first time the brake is vigorously actuated, and wherein the bending resistance of said pin means is such that when the brake arrangement is vigorously actuated for the first time, said pin means will, if necessary, become permanently deformed until the brake lining of the respective brake shoe lies against said brake drum.

4. The combination defined in claim 3, wherein the width of said elongated openings increases in the direction in which said brake shoes are displaced as the result of wear of the brake lining.

5. Th combination defined in claim 1, wherein said return spring means comprise a first spring which is parallel to the longitudinal axis of said brake shoe support means and which has its ends connected, respectively, to the two ends of the two brake shoes which abut said brake shoe support means, a second spring having one of its ends connected to said primary brake shoe and the other of its ends connected to a stationary point of the brake, and a third spring having one of its ends connected to said stationary brake shoe and the other of its ends connected to a stationary point of the brake, said second and third springs each forming a relatively large angle with said longitudinal axis of said brake shoe support means.

* * * * *